United States Patent
Kritchevsky

(10) Patent No.: US 9,248,965 B1
(45) Date of Patent: Feb. 2, 2016

(54) ITEM PROCESSING VERIFICATION USING IMAGING

(71) Applicant: Amazon Technologies, Inc., Reno, NV (US)

(72) Inventor: Alexander Jacob Kritchevsky, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 169 days.

(21) Appl. No.: 14/184,587

(22) Filed: Feb. 19, 2014

(51) Int. Cl.
*G06F 7/00* (2006.01)
*B65G 1/137* (2006.01)

(52) U.S. Cl.
CPC .................. *B65G 1/1371* (2013.01)

(58) Field of Classification Search
CPC ...................................... B65G 1/1371
USPC .......................................... 700/214
See application file for complete search history.

(56) References Cited

U.S. PATENT DOCUMENTS 7,769,221 B1* 8/2010 Shakes ...................... B07C 3/14
382/141
2013/0076898 A1* 3/2013 Philippe ................... H04N 7/18
348/143

\* cited by examiner

*Primary Examiner* — Kyle Logan
(74) *Attorney, Agent, or Firm* — Arthorus, PLLC

(57) ABSTRACT

This disclosure describes systems and methods for automatically verifying the processing of items within a materials handling facility. In many instances one or more items are processed in a materials handling facility and an agent processing the item must place the item in a designated container so that the item can be routed to the appropriate destination. By using image capture and analysis, the placement of the item in the appropriate container can be verified without requiring the agent to scan or otherwise identify the container into which the item was placed.

20 Claims, 7 Drawing Sheets ical description is set forth with reference to the
ITEM PROCESSING VERIFICATION USING IMAGING

BACKGROUND

Many companies utilize a materials handling facility to receive, sort, store and ship items to customers and/or to other locations. When items are received or moved within a materials handling facility they are often handled by various workers. Typically, a worker will select an item, scan its identifier (e.g., barcode) and transport or place the item in a new location and scan an identifier associated with the new location. Handling items multiple times and manually identifying the processing and placing of those items often leads to errors. For example, if a worker is receiving items into the materials handling facility, identifies a quantity of items that is incorrect and places those items into storage, the inventory count for the items will not correspond with the actual inventory of the item as stored in the materials handling facility.

Errors in the placement or quantity of items often leads to downstream problems and inefficiencies. For example, if the company believes that it has more inventory than is actually stored in the materials handling facility, it may sell more than it can deliver to customers. Such errors cost money and result in bad customer experiences.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
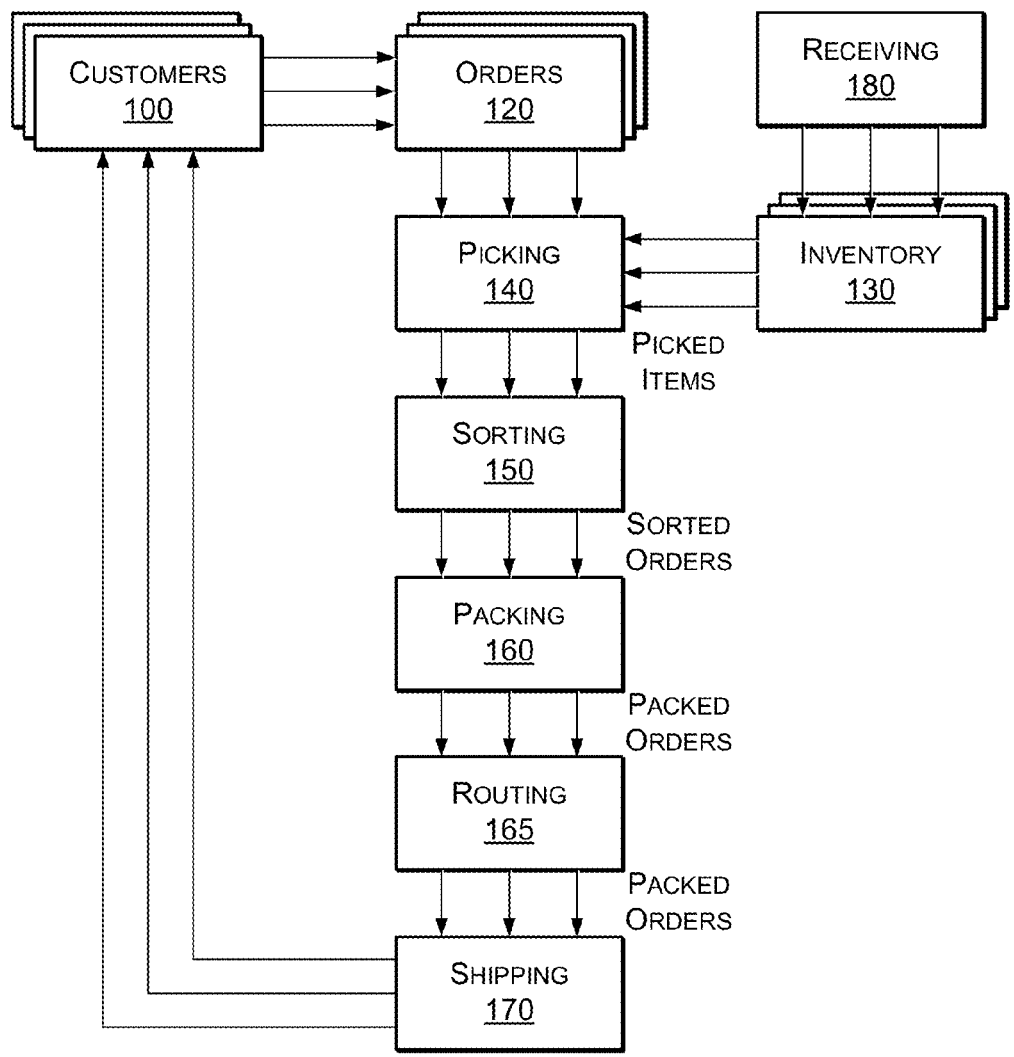
FIG. 1 illustrates a broad view of the operations of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and methods for automatically verifying the processing of items within a materials handling facility. In many instances one or more items are processed in a materials handling facility and an agent processing the item must place the item in a designated container so that the item can be routed to the appropriate destination. By using image capture and analysis, or other automated techniques discussed herein, the placement and/or quantity of the item can be automatically verified. For example, an agent may be located at a processing station that includes multiple containers into which processed items are to be placed. Each container is positioned at a different segment of the processing station and associated with a different destination (e.g., storage, transshipment, outbound, damaged, problem solve, liquidation). It is necessary for the agent to place the item in the appropriate container so that the item is delivered to its intended destination. For example, it is important that damaged items be placed in the container destined for a damaged item location, so that damaged items are not placed into inventory and/or shipped to a customer. An item may be determined damaged based on, for example, an agent identifying the item as damaged, the expiration date associated with the item and/or based on image processing of an image of the item.

When an item is processed, the agent may first scan a barcode or other identifier on the item to identify the item to an inventory management system. The inventory management system may determine a destination for the item and identify to the agent a container into which the item is to be placed. When the agent places the item into the container, rather than scanning a barcode on the container to confirm that the item was placed in the appropriate container, as is typically done, an imaging device (e.g., camera) positioned proximate to the processing station will detect an object change (the placement of the item) and notify the inventory management system of an object change in a segment of the processing station.

The inventory management system, upon receiving a notification of an object change, will determine if the object change corresponds with the position of the intended container. If the object change does correspond with the position of the container, the notification can be used as a verification that the item was placed in the right container. If the object change does not correspond with the position of the container, the inventory management system will notify the agent that the item was not placed in the intended container and instruct the agent to correct the error before processing additional items.

Using image capture and analysis to verify that items are placed into an appropriate container eliminates the manual processing step of scanning an identifier of the container after the item is placed in the container. Eliminating this manual step improves the speed and efficiency of an agent when processing items and reduces errors, thereby reducing costs and improving customer experiences. With existing systems that require a manual scan of the container, there is no verification that the item was actually placed into the container. For example, the agent may place the item in the wrong container but scan the identifier of the appropriate container. Without the implementations described herein, the inventory management system would incorrectly record that the item was placed in the appropriate container. As another example, the agent may place the item in the appropriate container but scan the identifier of the wrong container. The inventory management system would incorrectly provide instructions for the agent to remove the item from the container and place the item into the appropriate container. This often causes agent confusion, delays processing and sometimes results in the item being removed from the appropriate container and either set aside for later processing or placed into the wrong container.

In some implementations, additional automation of item processing may be performed with the implementations described herein. For example, the imaging device, or a second imaging device (e.g., camera) positioned proximate to the processing station, may be configured to capture images of items placed on the processing station table. The captured images/image data may be processed to identify the item and/or the quantity of the item being processed. For example, if the agent is receiving into the materials handling facility a quantity of five items of the same type, the agent may place all five items on the processing station table. The imaging device(s) may capture one or more images of the items. The images/data of the images may be processed to identify the item and the quantity of the item. This information may be provided to the inventory management system and used to identify the container or containers into which the items are to be placed.

In still further implementations, if pre-processing is to be performed with respect to an item, the implementations described herein may be used to verify that the pre-processing was performed. For example, if an item is to be placed into a bag or wrapped with protective material prior to storage, images may be captured to verify that a bag was removed from the bag storage segment of the processing station, or that dunnage was removed from the dunnage storage segment of the processing station.

In each instance, the image processing needed to verify the processing is minimal. As discussed further below, a change in pixels, a spectral level difference determination, and/or another algorithm to detect a change in objects, colors, shapes, etc., within a segment may be used to verify that the pre-processing and/or the processing was performed as intended. For example, when verifying that an item was placed in the appropriate container, in some implementations, the image processing may not verify the identity of the item placed in the container but simply detect that there has been a change (object change) in the segment that includes the container into which the item was placed. This object change can then be used to verify that the item was placed in the appropriate container. By using simple object change algorithms, the processing may be performed with limited computational demand.

While the disclosure herein focuses primarily on the processing of items at a receive processing station of a materials handling facility, the implementations described herein are equally applicable to any use of processing stations wherein item placement verification is desirable. For example, the implementations described herein may be used to verify processing of items at a rebin processing station (discussed below), a packing processing station, etc.

As used herein, the term "shipment set" may refer to a single item to be shipped, or to multiple items that have been grouped together for shipment. For example, a shipment set may represent a single item from a customer's order, multiple items from a customer's order, or all items from a customer's order. The term "package" may refer to any dimensionally-constrained environment, such as crates, cases, bins, boxes, bags, mailing envelopes or folders, or any other apparatus capable of handling a shipment set for storing, conveying or transporting.

A block diagram of a materials handling facility, which, in one implementation, may be an order fulfillment facility configured to utilize various systems and processes described herein, is illustrated in FIG. 1. In this example, multiple customers 100 may submit orders 120, where each order 120 specifies one or more items from inventory 130 to be shipped to the customer or to another entity specified in the order. An order fulfillment facility typically includes a receiving operation 180 for receiving shipments of stock items from various vendors, processing the items at a receive processing station so that the item can be tracked by an inventory management system and routing the received items to intended destinations. For example, received items may be routed to inventory 130 for storage, packing 160 for packaging and shipment directly to a customer, shipping 170 for shipment to a customer or transshipment to another materials handling facility, etc.

To fulfill the orders 120, the item(s) specified in each order may be retrieved or "picked" from inventory 130 (which may also be referred to as stock storage) in the order fulfillment facility, as indicated by picking operation 140 or routed directly from receiving 180. In some implementations, the items of a customer order may be divided into multiple shipment sets for fulfillment by an order planning system before fulfillment instructions are generated (not shown).

In this example, picked items may be delivered to one or more processing stations in the order fulfillment facility for sorting 150 into their respective shipment sets and for packing 160. A package routing operation 165 may sort packed orders for routing to one of two or more shipping operations 170, from which they may be shipped to the customers 100. The package routing operation 165 may in various implementations be automated or manual. The package routing operation 165 may receive an indication of the destination to which each packed order should be routed from an inventory management system.

In some implementations, the routing operation may be performed by an agent at a routing processing station that receives instructions identifying the appropriate packing station to which each item or order is to be routed for shipment. The packing station 160 may be selected based on the size or type of the packaging into which the items are to be packaged. For example, not all shipping packages utilized in the facility may be available at all of the packing stations 160. Similarly, some packing stations 160 may not have access to protective materials recommended for shipping fragile items or items for which additional protection may be appropriate. Therefore, if a shipment set requires special packaging, a routing operation may be configured to direct the item(s) from a routing processing station 165 to a packing processing station 160 at which an appropriate shipping package and/or protective materials are available. Likewise, if a fragile item is selected for picking and placement into a delivery package or transfer package, it may be routed to a packing station (not shown) at which appropriate protective material or packaging is available to allow for proper handling of the item(s).

In some implementations, items received at receiving 180 may not be stock inventory and may be processed at a receive processing station and delivered to the package routing operation 165 for shipping 170 to the customer 100. For example, receiving 180 may receive an item from a merchant that is to be delivered to a customer 100. When the agent at the receiving processing station begins processing the item, the inventory management system will identify that the item is to be placed into a container that will be delivered to the package routing operation 165 for shipping 170 to a customer 100. In another example, receiving may receive items from another materials handling facility or another vendor destined for a customer 100. In each instance, received items will be processed at a receiving processing station and placed into an appropriate container for delivery to an intended destination for storage, further processing, shipment, etc.

Note that not every fulfillment facility may include both sorting and packing processing stations. In certain implementations, agents may transfer picked items directly to a packing station, such as packing station 160, while in other implementations, agents may transfer picked items to a combination of sorting and packing stations (not illustrated). This may result in a stream and/or batches of picked items for multiple incomplete or complete shipment sets being delivered to a sorting processing station for sorting 150 into their respective shipment sets for packing and shipping, according to one implementation.

Portions of a shipment set may be received at different times or during different time intervals. When portions of a shipment set do not arrive during the same time interval, sorting 150 and packing 160 may have to wait for one or more items of some shipment sets to be delivered to the sorting station(s) before processing of the shipment set can be completed. As items arrive at a sorting processing station, they are identified by the inventory management system and instructions are provided to an agent as to where the item is to be placed for sorting. Images of the item placement may be captured and used to verify that the item was stored into the appropriate location.

Note that a picked, packed and shipped shipment set does not necessarily include all of the items ordered by the customer; a shipped shipment set may include only a subset of the ordered items available to ship at one time from one materials handling facility. Also note that the various operations of a materials handling facility may be located in one building or facility, or alternatively may be spread or subdivided across two or more buildings or facilities.

The arrangement and order of operations illustrated by FIG. 1 is merely one example of many possible implementations of the operation of a materials handling facility, such as an order fulfillment facility. Other types of materials handling, manufacturing, or order fulfillment facilities may include different, fewer, or additional operations and resources, according to different implementations.

Figure 2:
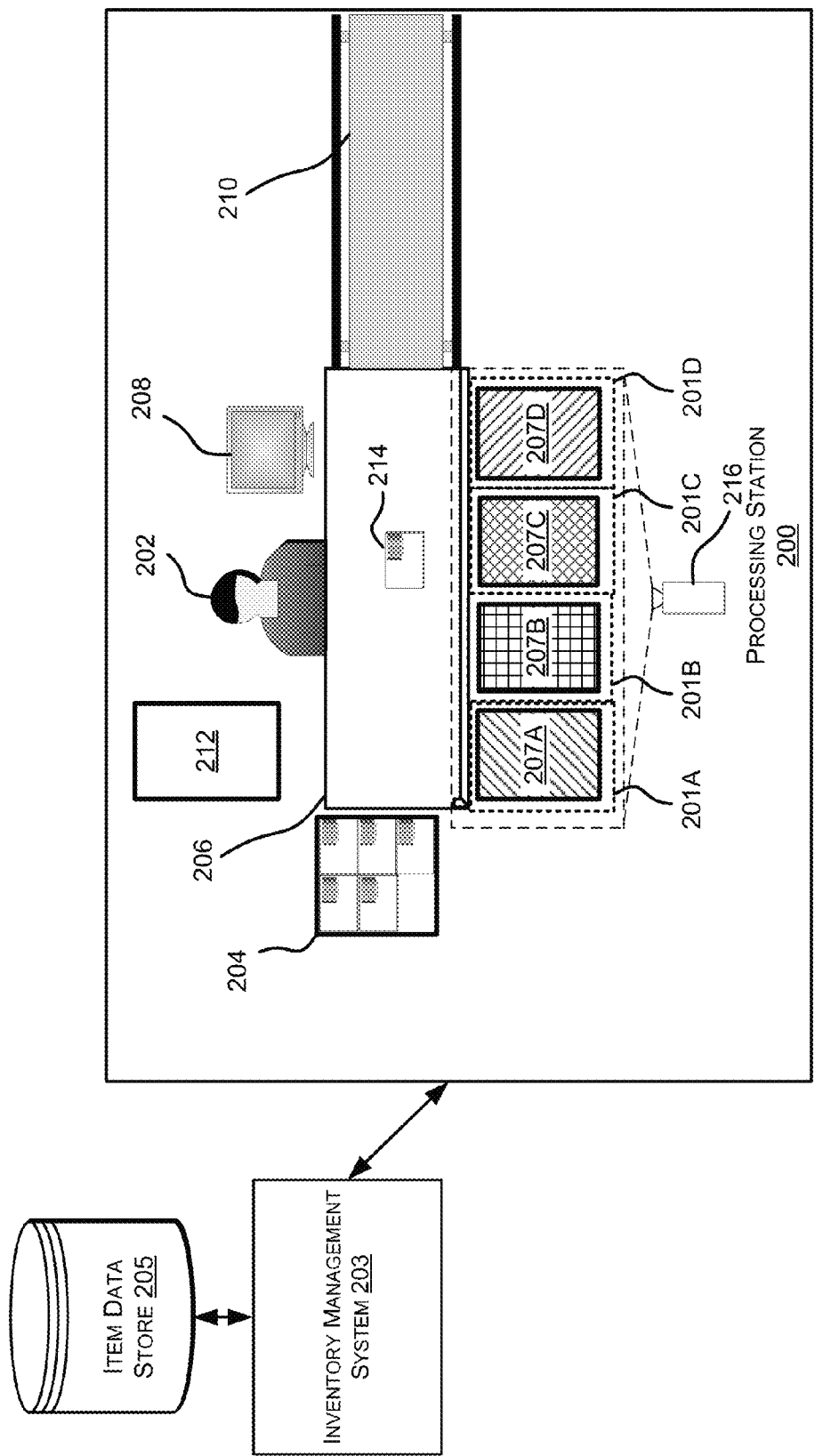
FIGS. 2-3 are block diagrams of a processing station within a materials handling facility, in accordance with an implementation.

FIG. 2 illustrates a partial view of a processing station 200, such as a receive processing station, that may be utilized with the implementations described herein. The processing station 200 allows at least one agent 202 to receive instructions from an inventory management system 203 for processing items. The processing station includes multiple segments 201A, 201B, 201C, 201D and each segment may include a container 207A, 207B, 207C, 207D into or onto which processed items may be placed. While the present example illustrates the processing station having four segments, in other implementations, the processing station may have fewer or additional segments. A container, as used herein, may include any movable structure onto or into which items may be placed. For example, a container may be a tote, box, bin, pallet, Gaylord, conveyor, cart, etc.

Each segment 201A-201D and corresponding container 207A-207D are associated with a destination. Destinations may include, for example, a storage location, a transshipment station for delivery of the container to a second materials handling facility, an outbound station for delivery of items included in the container to a user, a packing station for packing of the items included in the container, a problem solving station for resolving a problem with the item(s), a liquidation station for liquidation of the items, or a rebin station for rebinning the items included in the container.

As an illustrative example, segment 201A and container 207A positioned at segment 201A may be associated with inventory storage such that all items placed into container 207A will be directed to a storage area for storage in the materials handling facility. When the container is full of items, it may be removed from the segment 201A by the agent 202, placed on a conveyor 210 or other transport mechanism and directed to its intended destination (e.g., storage). When a container is removed from a segment, the inventory management system updates the item data store 205 to identify that the items included in the container have left the processing station 200 and are being directed to their next destination. Likewise, the agent 202 may place a new container, selected from a container stack 212, at the now empty segment 201A. The newly added container may be identified to the inventory management system 203 using the techniques discussed herein. The inventory management system 203, upon receiving an identification of the new container may associate the container with the segment into which the container has been placed and determine a destination for the container. This may be a same destination or a different destination compared to the destination of the container that was previously removed from the segment. Instructions may then be provided to the agent 202 to place items in the newly added container that are intended for the destination.

In some implementations, the segments of the processing station 200 and/or the containers 207A-207D located at those segments may be color coded or include other identifiers (e.g., numbers, names, shapes) that can be used by the inventory management system 203 to identify to the agent 202 into which container an item is to be placed. For example, each segment of a processing station may be a different color and the inventory management system may identify the segment color when providing instructions to an agent for placement of an item. Likewise, each container may be a different color, shape, size, etc., and used by the inventory management system 203 to provide instructions to the agent 202 as to where to place items being processed.

Items to be processed may be received at the processing station 200 in a variety of fashions. For example, if the processing station 200 is a receive processing station of a materials handling facility, the items may be received from manufacturers, vendors, merchants, etc. In some implementations, the receive processing station may be the first processing of new items when they arrive at the materials handling facility. As such, it is important that the items and the item quantities be correctly identified as the processing is the first introduction of the items into the materials handling facility. As items arrive at the processing station 200, the agent 202 may select an item or a group of items for processing. In some implementations, a group of items 204 may arrive in a large container, on a pallet, etc., for receiving into the materials handling facility. The agent 202 may retrieve an item 214 and place it on the processing station table 206 and identify the item to the inventory management system 203. In this implementation, the agent may use a barcode scanner (not shown) to scan a barcode located on the item and the barcode may be used to identify the item to the inventory management system. In other implementations, as discussed further below, other techniques may be used to identify the item 214.

The inventory management system 203, upon receiving an identification of an item being processed, may query an item data store to determine the processing and/or pre-processing to be performed with respect to the item. If pre-processing is to be performed, as discussed further below, pre-processing instructions may be provided by the inventory management system 203 to the agent via a display 208 or other output device located at or near the processing station 200. Likewise, processing instructions may be sent by the inventory management system 203 for presentation to the agent 202 via the display 208 or other output device. While the output device is illustrated in this example as a display 208, instructions may be provided to an agent using any output device. For example, the output device may be a projector for visually projecting the instructions, a display 208, such as a liquid crystal display, plasma, etc., a portable device, and/or provided via audio output, such as through a speaker.

Based on the instructions provided to the agent 202, the agent 202 may perform pre-processing with respect to the item 214 and/or place the item into a container 207A-207D. For example, processing instructions may be sent by the inventory management system 203 for presentation to the agent 202 identifying a container 207A-207D into which the item is to be placed.

In traditional systems, when the agent 202 placed the item into a container 207A-207D, the agent was required to scan a barcode located on the container to identify the container to the inventory management system. Likewise, when a new container was placed at a segment of the processing station, the agent was required to scan a barcode or other identifier located on the container that the inventory management system 203 could identify the container and confirm item placement from subsequent scans of the container barcode or other identifier. In the implementations described herein, scanning of a container barcode or other identifier by the agent 202 is no longer necessary.

In accordance with an implementation, an image capture device 216, such as a camera positioned proximate to the processing station, may be oriented such that a field of view of the image capture device includes one or more of the segments 201A-201D of the processing station 200. In one implementation, the image capture device 216 may be configured in a fixed position such that the field of view includes all segments 201A-201D of the processing station. Different portions of the field of view may be associated with the segments of the processing station such that when an object change is detected, the image capture device may identify the corresponding segment in which the object change occurred. In this example, the field of view of the camera may be divided into quarters and each quarter associated with a segment 201A-201D of the processing station.

As images of the entire field of view are captured, they may be compared to one or more preceding images to determine if there has been any change in the field of view. For example, a spectral level difference between a series of images may be determined to identify changes in the compared images. A threshold value may be set such that if the determined difference exceeds the threshold, it may be determined that an object change in the segment has occurred. As another example, the threshold may correspond to the amount of change in the color space of each pixel. If the amount of color change of pixels associated with a segment exceed the threshold, it may be determined that an object change in the associated segment has occurred. As will be appreciated, any variety of image and/or object comparison techniques may be used to detect an object change within a segment of the processing station and the techniques discussed above are provided merely as examples.

Processing of images to detect an object change may be done by the image capture device 216 and/or by the inventory management system 203. For example, the image capture device may capture and compare images to detect an object change and determine the segment of the processing station at which the object change occurred. A notification that includes the identification of an object change and the corresponding segment may then be provided to the inventory management system 203. As another alternative, captured images may be provided directly by the image capture device 216 to the inventory management system 203 and the inventory management system 203 may process the images to identify an object change and the corresponding segment of the processing station.

When an object change notification is received or detected by the inventory management system 203, the inventory management system determines if the segment in which the object change occurred corresponds to the container into which the item was to be placed. If the segment in which the object change occurred does correspond to the container into which the object was to be placed, the inventory management system updates the item data store 205 to identify that the item is located in the container. However, if the segment in which the object change occurred does not correspond with the container into which the item was to be placed, the inventory management system 203 may send a notification and/or instruction to the agent 202 identifying that the item was not placed in the intended container. Likewise, the notification may instruct the agent to remove the item from the container and place the item in the intended container.

In addition to verifying that an item being processed was placed in the intended or determined container, the implementations described herein may also be used to automate the replacement and/or transition of containers. For example, when a container is full, an agent may remove the container from the segment 201A-201D of the processing station and place the container on a conveyor 210 or other transport mechanism so the container and the contained items are directed to their next destination. Using the same or different image capture device 216 and the same or different object change detection techniques, an object change within the segment from which the container was removed may be detected as a result of the container removal and a corresponding object change notification provided to the inventory management system 203.

The inventory management system 203 can determine the object change is a container removal because it should only occur when no item is being processed (i.e., the inventory management system is not expecting an object change notification from an item placement). Alternatively, the amount of the change (e.g., the spectral level difference) may be utilized to determine that the container was removed.

Upon detecting an object change resulting from a container removal, the inventory management system 203 stores a change in the item data store 205 identifying that the container and the contained items have been transitioned from the processing station 200 and are being directed toward their next destination. In addition, the inventory management system will begin a routine to wait for a new container to be placed in the segment of the processing station 200 from which the other container was removed.

A new container placed at the segment of the processing station will cause another object change to be detected by the image capture device 216 that will be reported to the inventory management system 203. Upon receiving the object change notification, the inventory management system 203 will specify a destination to be associated with the new container and will begin instructing the agent 202 to begin placing items destined for the specified destination into the new container as part of the item processing.

Figure 3:
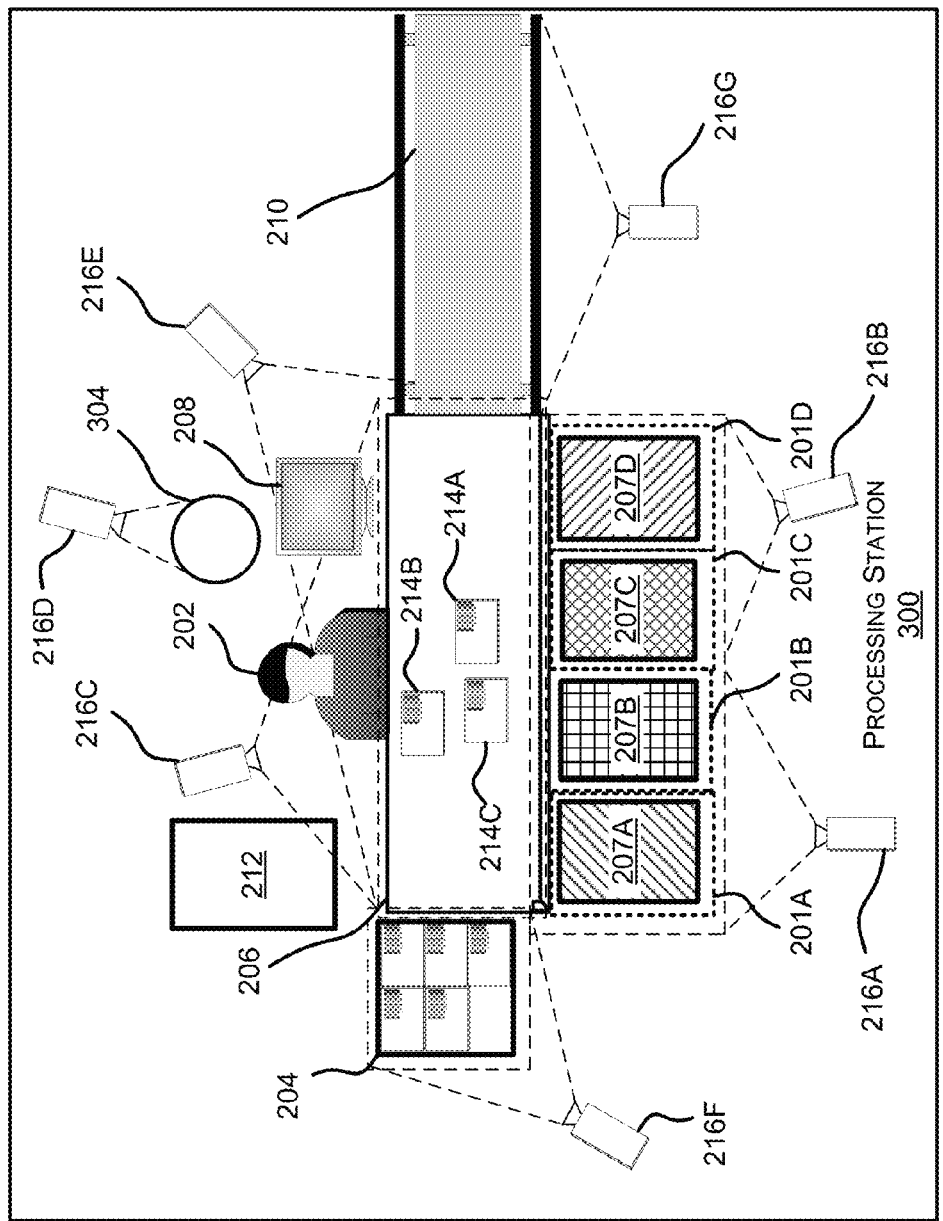
Figure 3:
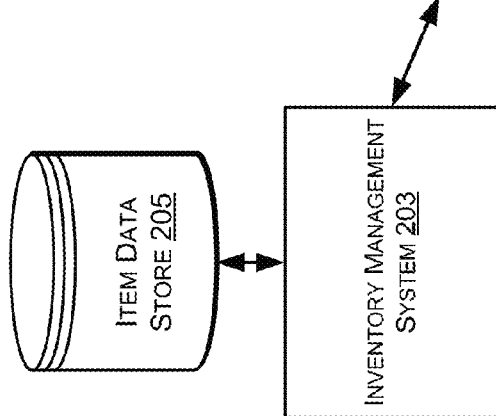

FIG. 3 illustrates another partial view of a processing station 300, such as a receive processing station, that may be utilized with the implementations described herein. Similar to processing station 200 of FIG. 2, the processing station 300 includes a processing station table 206, segments 201A-201D, containers 207A-207D, conveyor 210, display 208, extra container stack 212 and items 204 to be processed.

Likewise, the processing station 300 may be in communication with the inventory management system 203.

In comparison to the processing station 200, processing station 300 includes multiple image capture devices 216, such as cameras, positioned so that the field of view of each camera covers different areas of the processing station 300. For example, camera 216A may be positioned so that the field of view covers two segments 201A-201B of the processing station. Camera 216B may be positioned so that the field of view covers two other segments 201C-201D of the processing station 300. Similar to the discussion above, the cameras positioned so that the field of view covers one or more segments may be utilized to detect object changes in those segments and report object change notifications to the inventory management system 203. In this example, the processing station may also include other cameras 216C, 216D, 216E, 216F that are positioned to detect other activities within the processing station 300.

For example, cameras 216C, 216E may be positioned so that the field of view of each covers the processing station table 206. In this implementation, two or more cameras may be used so that a stereo or three-dimensional image of an item(s) placed on the processing station table 206 can be generated from a composite of images captured from the multiple cameras. The images of an item(s) placed on the processing station table 206 may be used to identify the item(s), determine the quantity of the item placed on the table, determine if an item placed on the table is damaged, determine dimensions of the item, etc. As illustrated in FIG. 3, an agent 202 may place multiple items 214A, 214B, 214C that are to be processed on the processing station table 206. Rather than the agent 202 having to specify to the inventory management system 203 the number of items being processed, the images captured may be processed to determine a number of items positioned on the processing station table 206. Likewise, additional image processing may be performed, local and/or remote (e.g., cloud) to confirm that the items are all of the same item type and/or to identify the item. For example, image and/or object recognition may be performed with respect to the captured images to identify a name of the item, a barcode, or other item identifier to confirm that the items are alike and/or to identify the items.

In some implementations, a camera 216F may also be positioned proximate to the processing station 300 so that the field of view covers the receiving area where items to be processed by the agent 202 are placed. Likewise, a camera 216G may be positioned such that it has a field of view that includes a conveyor belt or other exit from the processing station 300. Images may be captured and processed to identify the items, the merchant, the container in which the items arrive at the processing station 300, depart the processing station 300, etc. Such information may be provided to the inventory management system 203 and used to identify the origin of the items, to determine where the items will be routed as part of processing, etc.

If pre-processing of items may be performed at the processing station 200, image capture devices, such as camera 216D, may be positioned proximate to the processing station 300 so that the field of view includes a segment 304 that includes materials or items needed for the pre-processing. Pre-processing may include, for example, bagging an item prior to storage, taping the item, wrapping the item with dunnage, labeling the item, gift wrapping the item, etc. The location segment in the field of view that is used to verify that the pre-processing was performed may include a label storage location, a dunnage storage location, a bag storage location, a tape storage location, a protective materials location, etc.

Similar to detecting an object change in a segment of the processing station, when the user reaches into a segment associated with pre-processing (e.g., to grab a bag or dunnage), an object change resulting from the user reaching into the segment will be detected by the image capture device and reported to the inventory management system 203. The object change in a segment associated with pre-processing may be detected using the same or different object change detection techniques discussed herein.

As discussed further below, when the inventory management system 203 receives an object change notification from an image capture device positioned to cover a segment associated with pre-processing, the inventory management system determines if the segment corresponds to the pre-processing instruction provided to the agent. If the segment corresponds to the pre-processing instruction provided to the agent 202, the inventory management system 203 confirms that the pre-processing was performed and may issue additional pre-processing instructions or processing instructions. However, if the segment does not correspond with the provided pre-processing instructions, the inventory management system 203 will provide a notification to the agent 202 that the wrong pre-processing has been performed.

Figure 4:
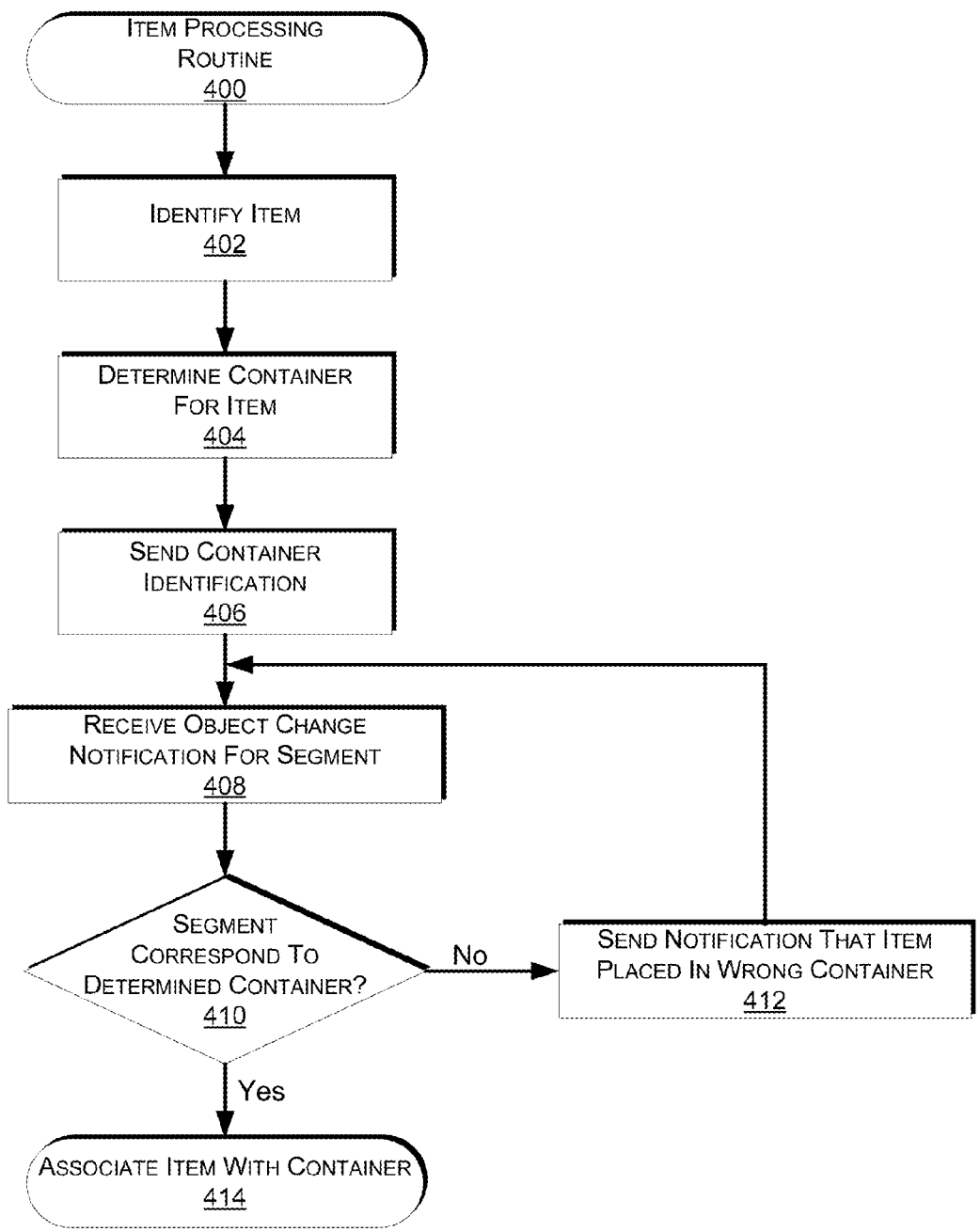
FIG. 4 is a flow diagram illustrating an example routine for processing an item, in accordance with an implementation.

FIG. 4 is a flow diagram illustrating an example item processing routine 400, according to an implementation. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example item processing routine 400 begins by identifying an item 402. An item may be identified by an agent scanning a barcode or other identifier that can be used to identify the item. In other implementations, an agent may select the item from a list of items or provide an identifier for the item. In still other implementations, one or more images of the item may be captured and processed to identify the item. For example, an image of the item may be captured and object and/or image recognition performed to identify the item. In some implementations, if the identity of the item cannot be confirmed above a defined level of certainty, the agent may be asked to confirm the identity of the item. For example, if the image processing can narrow the item down to potentially three different items, the agent may be asked to specify which of the three potential items matches the actual item to be processed.

Upon identifying the item, a container into which the item is to be placed is determined 404. As discussed above, a processing station may include multiple containers into which processed items may be placed. Each container may be directed to different locations (e.g., storage, transshipment, outbound). When the item is identified, the destination of the item is determined and the container that is scheduled to be delivered to that destination identified and used as the determined container for the item. The identity of the determined container is sent to the processing station as an instruction for placement of the item into the container 406. For example, the instructions that identify the container may be sent to a display located at the processing station and presented on the display to the agent. In other implementations, each segment of the processing station at which the containers are located may include lighting or other identifiers that can be activated/illuminated to identify to the agent where the item being processed is to be placed.

Once the item has been placed in the container, an image capture device positioned so that the field of view of the image capture device includes the container detects an object change resulting from the item being placed in the container. Upon detecting an object change, an object change notification is provided by the image capture device and received by the inventory management system 408. In other implementations, the images may be provided to the inventory management system and the inventory management system may determine the object change. An object change notification may include both a notification of the object change as well as a segment in which the object change was detected. For example, if an image capture device is positioned such that the field of view covers six different segments of a processing station, portions of the field of view may be associated with different segments of the processing station. When an object change is detected, the portion of the field of view is determined and the corresponding segment of the processing station identified.

Upon receipt of an object change notification, a determination is made as to whether the segment in which the object change was detected corresponds with the determined container 410. If it is determined that the segment corresponds with the determined container, the item data store is updated to associate the item with the determined container 414. However, if it is determined that the segment in which the object change was detected does not correspond with the determined container, a notification is sent identifying that the item was not placed in the determined container 412. The notification may also include instructions to remove the item from the container in which it was placed and to place the item in the determined container. After providing the notification, the example item processing routine 400 returns to block 408 and waits to receive another change notification.

Figure 5:
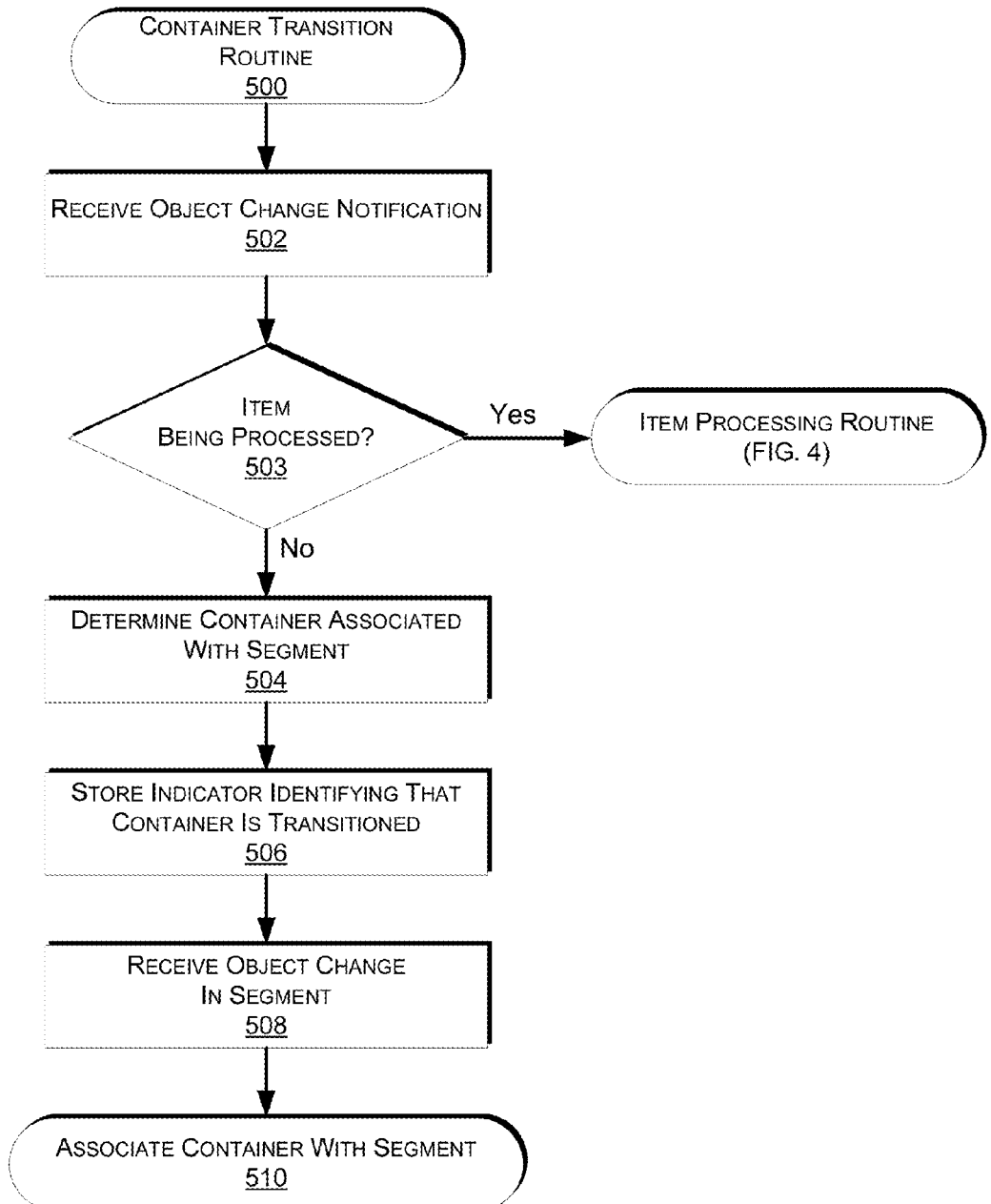
FIG. 5 is a flow diagram illustrating an example routine for transitioning a container, in accordance with an implementation.

FIG. 5 is a flow diagram of an example container transition routine 500, according to an implementation. The example container transition routine 500 begins by receiving an object change notification 502. As discussed above, the object change notification identifies that an object has changed and an identification of a segment of the processing station corresponding to where the object change occurred. Upon receiving an object change notification, a determination is made as to whether an item is being processed 503. If it is determined that an item is being processed, the example container transition routine 500 completes and the example item processing routine 400 continues, as discussed above. In such an implementation, the transition of a container would only occur when an item is not being processed. In other implementations, the amount of an object change detection may be determined to assess whether the change is an object being added to a container or an entire container being transitioned. For example, a first threshold may be established that when a change between images exceeds the first threshold it is determined that an object has been added. A second, higher threshold, may exist and when it is determined that the change between a series of images exceeds that second threshold that the entire container has been transitioned. As another example, the segment of the processing station on which the container(s) are placed may be of a particular color or colors and when that color(s) is detected by the image capture device it may be determined that the container has been removed from the processing station.

Returning to FIG. 5, if it is determined that an item is not being processed, or that a container has been transitioned (e.g., a second, higher change threshold has been exceeded), the container associated with the segment in which the object change occurred is determined 504. As discussed above, when a container is placed at a segment the container is identified and associated with that segment. When the container is transitioned from the segment, that association is used to identify the container. Upon identifying the container associated with the segment in which the object change occurred, an item data store is updated to identify that the container and the items included in the container have been transitioned from the processing station and are being directed toward their intended destination 506.

At some point after the object change that was detected from the removal of the container, a subsequent object change notification will be received for the same segment 508. For example, when the user places a new container at the segment, the image capture device positioned so that the field of view covers the segment will detect another object change resulting from the placement of the new container at the segment. Upon receiving the object change notification, the new container is identified, a destination for the container determined and the container is associated with the segment in which the object change occurred 510. As discussed above, the destination may always be the same for any containers placed in the same segment. In other implementations, the destination of the container may change each time a new container is placed in a segment. Such changes may be specified by the inventory management system based on, for example, current demand for items, processing capacity at the destinations, items to be received, etc.

Figure 6:
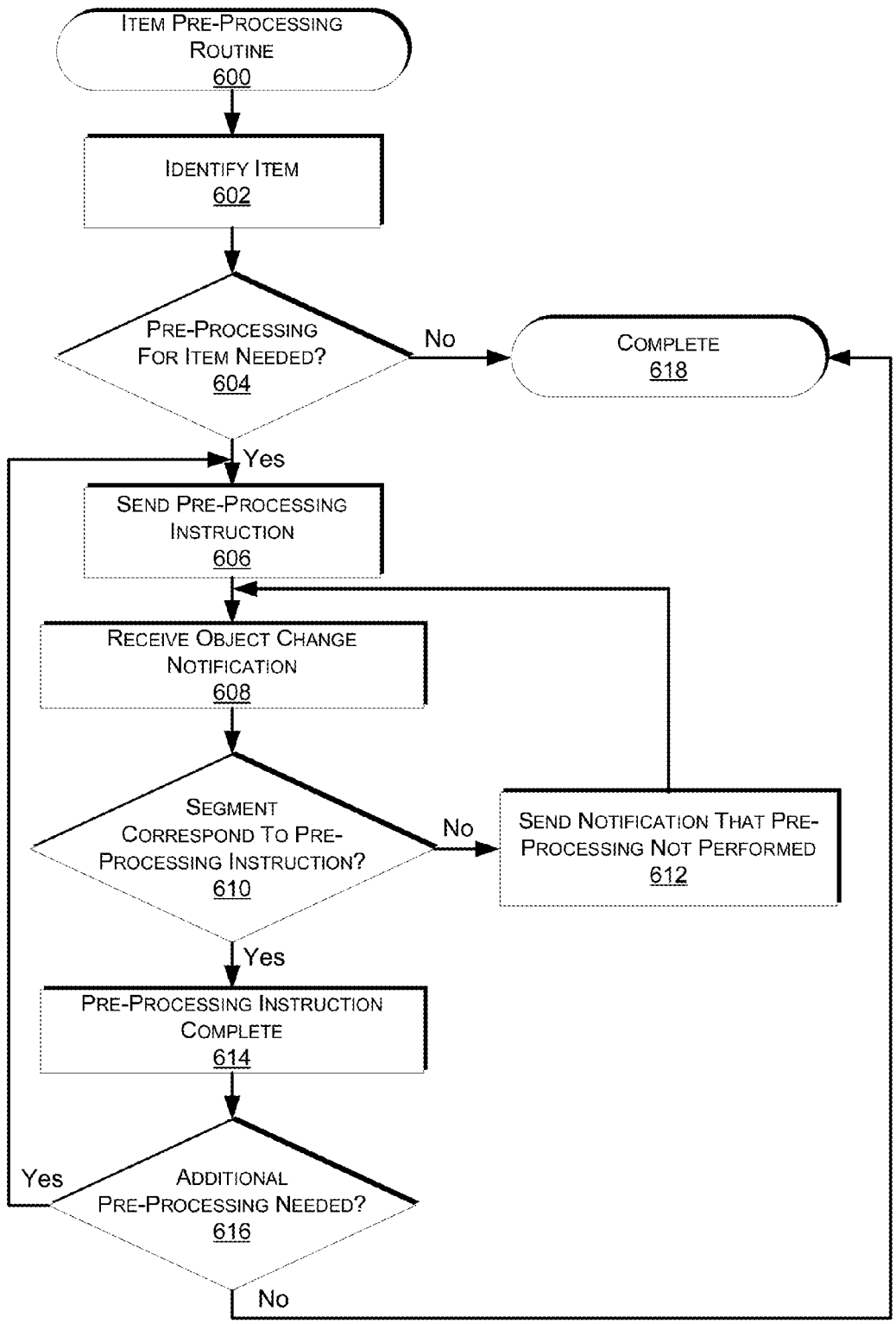
FIG. 6 is a flow diagram illustrating an example routine for pre-processing an item, in accordance with an implementation.

FIG. 6 is a flow diagram of an example item pre-processing routine 600, according to an implementation. The example item pre-processing routine 600 begins by identifying an item 602. An item may be identified using any of the techniques discussed above with respect to item identification. Upon item identification, a determination is made as to whether the item needs any pre-processing 604. If it is determined that the item does not need pre-processing, the example pre-processing routine completes 618. In some implementations, upon completion of the example item pre-processing routine, the example item processing routine 400 (FIG. 4) may be performed with respect to the item.

If it is determined that pre-processing is to be performed with respect to the item, pre-processing instructions are sent to the processing station 606. Pre-processing may include, placing the item in a bag before storage, wrapping the item with dunnage, labeling the item, etc.

At some point after sending the pre-processing instructions an object change notification should be received 608. The object change notification identifies both the object change and the segment of the processing station in which the object changed occurred. Upon receiving an object change notification, a determination is made as to whether the segment identified in the object change notification corresponds with the provided pre-processing instructions 610. For example, the segment may include a location where items needed for the pre-processing are stored (e.g., bag or dunnage storage locations).

If it is determined that the segment does not correspond to the pre-processing instructions, a notification may be sent to the processing station identifying that the instructed pre-processing has not been performed 612. The notification may also instruct that the pre-processing be performed and the example routine may return to block 608 and continue.

If it is determined that the segment does correspond to the pre-processing instructions, the pre-processing instructions are identified as completed 614. In some implementations, it is only determined that the items needed to perform the pre-processing are retrieved, not that the actual pre-processing has been performed. Once the needed items are retrieved it can be assumed that the agent will complete the pre-processing.

Once it is determined that the pre-processing has completed, a determination is made as to whether additional pre-processing is to be performed with respect to the item 616. If it is determined that additional pre-processing is to be performed, the example pre-processing routine returns to block 606 and continues. In some implementations, if there are multiple pre-processing activities to be performed, the order in which those activities are performed may not be specific. In such an implementation, the agent may receive instructions to perform multiple items of pre-processing that can be performed in any order. When an object change is detected, it is determined if the segment associated with the object change corresponds with any of the pre-processing instructions (decision block 610).

If it is determined that additional pre-processing is not to be performed with respect to the item, the example pre-processing routine 600 completes 618. As noted above, upon completion of the example pre-processing routine 600, in some implementations, the example item processing routine 400, discussed above with respect to FIG. 4, may be performed with respect to the item.

Various operations of the inventory management system, such as those described herein, may be executed on one or more computer systems, interacting with various other devices and/or processing stations in a materials handling facility, according to various implementations. One such computer system is illustrated by the block diagram in FIG. 7. In the illustrated implementation, a computer system 700 includes one or more processors 710A, 710B through 710N, coupled to a non-transitory computer-readable storage medium 720 via an input/output (I/O) interface 730. The computer system 700 further includes a network interface 740 coupled to an I/O interface 730, and one or more input/output devices 750. In some implementations, it is contemplated that an inventory management system may be implemented using a single instance of the computer system 700, while in other implementations, multiple such systems or multiple nodes making up the computer system 700 may be configured to host different portions or instances of an inventory management system. For example, in one implementation, some data sources or services may be implemented via one or more nodes of the computer system 700 that are distinct from those nodes implementing other data sources or services. In some implementations, a given node may implement the functionality of more than one component of an inventory management system.

In various implementations, the computer system 700 may be a uniprocessor system including one processor 710A, or a multiprocessor system including several processors 710A-710N (e.g., two, four, eight, or another suitable number). The processors 710A-710N may be any suitable processor capable of executing instructions. For example, in various implementations, the processors 710A-710N may be general-purpose or embedded processors implementing any of a variety of instruction set architectures (ISAs), such as the x86, PowerPC, SPARC, or MIPS ISAs, or any other suitable ISA. In multiprocessor systems, each of the processors 710A-710N may commonly, but not necessarily, implement the same ISA.

The non-transitory computer-readable storage medium 720 may be configured to store executable instructions and/or data accessible by the one or more processors 710A-710N. In various implementations, the non-transitory computer-readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer-readable storage medium 720 as program instructions 725 and data storage 735, respectively. In other implementations, program instructions and/or data may be received, sent or stored upon different types of computer-accessible media, such as non-transitory media, or on similar media separate from the non-transitory computer-readable storage medium 720 or the computer system 700. Generally speaking, a non-transitory, computer-readable storage medium may include storage media or memory media such as magnetic or optical media, e.g., disk or CD/DVD-ROM coupled to the computer system 700 via the I/O interface 730. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 740.

In one implementation, the I/O interface 730 may be configured to coordinate I/O traffic between the processors 710A-710N, the non-transitory computer-readable storage medium 720, and any peripheral devices in the device, including the network interface 740 or other peripheral interfaces, such as input/output devices 750. In some implementations, the I/O interface 730 may perform any necessary protocol, timing or other data transformations to convert data signals from one component (e.g., non-transitory computer-readable storage medium 720) into a format suitable for use by another component (e.g., processors 710A-710N). In some implementations, the I/O interface 730 may include support for devices attached through various types of peripheral buses, such as a variant of the Peripheral Component Interconnect (PCI) bus standard or the Universal Serial Bus (USB) standard, for example. In some implementations, the function of the I/O interface 730 may be split into two or more separate components, such as a north bridge and a south bridge, for example. Also, in some implementations, some or all of the functionality of the I/O interface 730, such as an interface to the non-transitory computer-readable storage medium 720, may be incorporated directly into the processors 710A-710N.

The network interface 740 may be configured to allow data to be exchanged between the computer system 700 and other devices attached to a network, such as other computer systems, processing stations within the materials handling facility, and/or between nodes of the computer system 700. In various implementations, the network interface 740 may support communication via wired or wireless general data networks, such as any suitable type of Ethernet network. For example, the network interface 740 may support communication via telecommunications/telephony networks such as analog voice networks or digital fiber communications networks, via storage area networks such as Fibre Channel SANs, or via any other suitable type of network and/or protocol.

Input/output devices 750 may, in some implementations, include one or more display terminals, keyboards, keypads, touchpads, scanning devices, voice or optical recognition devices, or any other devices suitable for entering or retrieving data by one or more computer systems 700. Multiple input/output devices 750 may be present in the computer system 700 or may be distributed on various nodes of the computer system 700. In some implementations, similar input/output devices may be separate from the computer system 700 and may interact with one or more nodes of the computer system 700 through a wired or wireless connection, such as over the network interface 740.

Figure 7:
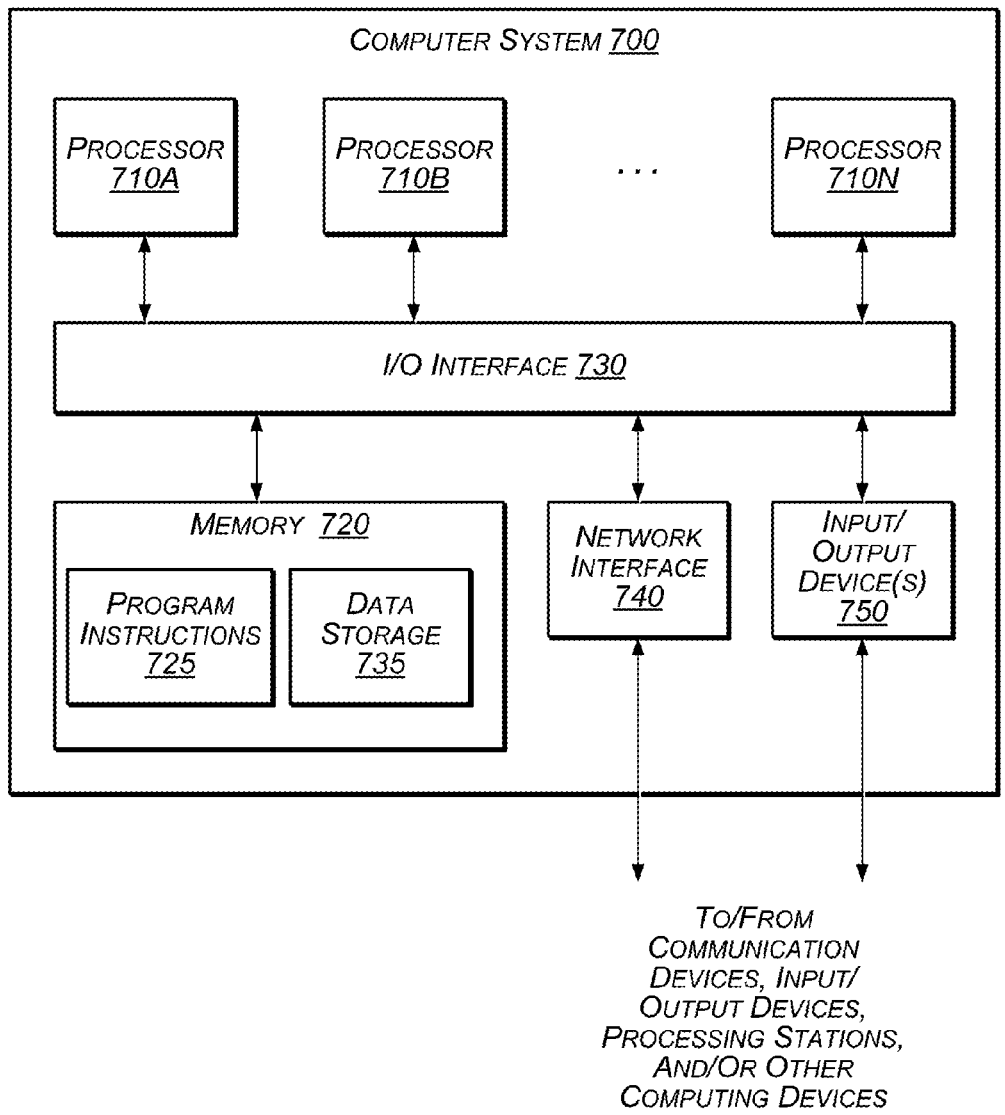
FIG. 7 is a block diagram illustrating an example computer system configured to implement one or more of the processing related operations described herein.

As shown in FIG. 7, the memory 720 may include program instructions 725 which may be configured to implement an inventory management system and data storage 735, which may comprise various tables, data store, such as the item data store discussed above, and/or other data structures accessible by the program instructions 725. The data storage 735 may include various data stores for maintaining data representing physical characteristics of items, containers, processing stations, segments, etc.

In various implementations, the parameter values and other data illustrated herein as being included in one or more data stores may be combined with other information not described or may be partitioned differently into more, fewer, or different data structures. In some implementations, data stores used in an inventory management system, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up an inventory management system and/or any of the various components thereof described herein.

Those skilled in the art will appreciate that the computing system 700 is merely illustrative and is not intended to limit the scope of implementations. In particular, the computing system and devices may include any combination of hardware or software that can perform the indicated functions, including computers, network devices, internet appliances, PDAs, wireless phones, smartphones, etc. The computing system 700 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the methods and systems discussed above may be provided in alternative ways, such as being split among more software modules or routines or consolidated into fewer modules or routines. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method for verifying a processing of an item received into a materials handling facility, comprising:

under control of one or more computing systems configured with executable instructions,
receiving an identification of an item being processed by an agent at a processing station;
determining a container from a plurality of containers into which the item is to be placed;

sending for presentation to the agent a container identification representative of the determined container;

receiving an object change notification from a camera that identifies a segment from a plurality of segments of the processing station, wherein:

the camera is positioned to have a field of view that covers the plurality of segments of the processing station; and each of the plurality of segments includes a container from the plurality of containers;

determining if the identified segment corresponds with the determined container; and in response to determining that the identified segment corresponds with the determined container, associating in a data store the item with the determined container.

2. The computer-implemented method of claim 1, further comprising:

in response to determining that the identified segment does not correspond with the determined container, sending for presentation to the agent a notification that the item was not placed in the determined container.

3. The computer-implemented method of claim 1, wherein the object change is detected based at least in part on a determined spectral level difference.

4. The computer-implemented method of claim 1, wherein receiving an identification of the item includes:

receiving an image of the item captured by a second camera; and processing the image to identify the item.

5. A non-transitory computer-readable storage medium storing instructions for verifying a processing of an item within a materials handling facility, the instructions when executed by a processor causing the processor to:

receive an identification of an item being processed at a processing station within the materials handling facility;

determine a container from a plurality of containers into which the item is to be placed, the plurality of containers positioned at different ones of a plurality of segments of the processing station;

receive, from an image capture device, an object change notification associated with a segment of the plurality of segments of the processing station;

determine if the segment is associated with the determined container; and in response to a determination that the segment is associated with the determined container, associate the item with the container.

6. The non-transitory computer readable storage medium of claim 5, the instructions when executed by the processor further causing the processor to:

receive a second notification of a second object change associated with a second segment of the plurality of segments of the processing station;

determine that the second object change is a result of a second container associated with the second segment being moved from the second segment; and store an indicator that the second container has transitioned from the processing station.

7. The non-transitory computer readable storage medium of claim 5, the instructions when executed by the processor further causing the processor to:

receive a second notification of a second object change associated with a second segment of the plurality of segments of the processing station;

determine that the second object change is a result of a second container being placed in the second segment; and store an association between the second container and the second segment.

8. The non-transitory computer readable storage medium of claim 5, wherein each container of the plurality of containers is to be transitioned to different destinations.

9. The non-transitory computer readable storage medium of claim 8, wherein the different destinations include at least one of a storage location, a transshipment station for delivery of the container to a second materials handling facility, an outbound station for delivery of items included in the container to a customer, a packing station for packing of the items included in the container, a problem solving station, a liquation station, or a rebin station for rebinning the items included in the container.

10. The non-transitory computer readable storage medium of claim 5, the instructions when executed by the processor further causing the processor to:

determine that the item is damaged; and wherein the container is determined based at least in part on the determination that the item is damaged.

11. The non-transitory computer readable storage medium of claim 10, wherein the item is determined to be damaged by at least one of: an agent identifying the item as damaged, an expiration date associated with the item, or processing an image of the item to determine that the item is damaged.

12. The non-transitory computer readable storage medium of claim 5, the instructions when executed by the processor further causing the processor to:

determine that the item is to be pre-processed before it is placed into the container; and send a pre-processing instruction identifying a pre-processing to be performed with respect to the item.

13. The non-transitory computer readable storage medium of claim 12, the instructions when executed by the processor further causing the processor to:

receive a second notification of an object change associated with a segment of the processing station related to the pre-processing to be performed with respect to the item.

14. The non-transitory computer readable storage medium of claim 13, wherein the segment is at least one of a bag storage location, a tape storage location, a label storage location, a protective materials location, or a dunnage storage location.

15. A system, comprising:

a processing station;

an imaging device positioned proximate to the processing station, the imaging device positioned to have a field of view including a segment of the processing station, wherein:

a container is positioned within the segment; and the imaging device is configured to detect an object change within the segment when an item is placed into or removed from the container;

a computing device in communication with the imaging device, the computing device configured to:

receive an identification of an item to be processed at the processing station;

determine a container into which the item is to be placed;

send an instruction to place the item in the container;

receive from the imaging device a notification of an object change within the segment;

determine if the container within the segment corresponds to the determined container; and in response to a determination that the container within the segment corresponds to the determined container, store in a data store an association between the determined container and the item.

16. The system of claim 15, wherein the field of view includes a plurality of segments and each segment includes a container.

17. The system of claim 15, wherein the imaging device is positioned above the segment.

18. The system of claim 15, wherein the system includes a plurality of imaging devices and wherein each of the plurality of imaging devices has a field of view that includes at least one segment of the processing station.

19. The system of claim 15, wherein the computing device is further configured to:
   in response to a determination that the container within the segment does not correspond to the determined container, provide a notification that the item was not placed in the determined container.

20. The system of claim 15, wherein the object change is determined in response to an item being placed into the container.

\* \* \* \* \*